United States Patent
Joffe et al.

(10) Patent No.: US 7,821,758 B1
(45) Date of Patent: Oct. 26, 2010

(54) SYSTEMS AND METHODS FOR REDUCING INTERMODULATION DISTORTION

(75) Inventors: Daniel M. Joffe, Owens Crossroads, AL (US); Kevin Earnst, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 407 days.

(21) Appl. No.: 11/600,659

(22) Filed: Nov. 16, 2006

(51) Int. Cl.
*H02H 1/04* (2006.01)
*H02H 3/22* (2006.01)
*H02H 9/04* (2006.01)

(52) U.S. Cl. .......................... 361/119; 361/56; 361/111
(58) Field of Classification Search ................. 361/119, 361/56, 111
See application file for complete search history.

(56) References Cited

U.S. PATENT DOCUMENTS

| | | | | |
|---|---|---|---|---|
| 3,454,791 A | * | 7/1969 | Walter | ......................... 327/504 |
| 3,538,440 A | * | 11/1970 | Galloway | .................... 324/133 |
| 4,254,442 A | * | 3/1981 | Dijkmans et al. | ............. 361/56 |
| 4,581,487 A | * | 4/1986 | Cochran | ...................... 379/400 |
| 4,905,119 A | | 2/1990 | Webb | |
| 5,161,183 A | | 11/1992 | Maytum | |
| 5,577,041 A | * | 11/1996 | Sharma et al. | ............. 370/271 |
| 5,953,194 A | * | 9/1999 | Atkins | ........................ 361/119 |
| 2002/0075619 A1 | | 6/2002 | Maytum et al. | |
| 2002/0075623 A1 | | 6/2002 | Maytum et al. | |

OTHER PUBLICATIONS

Definition of Terms, Riedon Inc., www.riedon.com, pp. 3-4.*

* cited by examiner

*Primary Examiner*—Stephen W Jackson
*Assistant Examiner*—Zeev Kitov
(74) *Attorney, Agent, or Firm*—Lanier Ford Shaver & Payne, P.C.; Jon E. Holland

(57) ABSTRACT

Protection circuits for protecting equipment connected to a telecommunication wire pair is disclosed. A protection circuit in one embodiment utilizes a series arrangement of solid state protectors wherein at least some of the solid state protectors are biased. The protection circuit reduces the level of intermodulation distortion in broadband signals that is caused by nonlinear capacitance of solid state protectors.

16 Claims, 5 Drawing Sheets

SYSTEMS AND METHODS FOR REDUCING INTERMODULATION DISTORTION

FIELD OF THE DISCLOSURE

The present disclosure relates to systems and methods for voltage protection of communication system equipment connected to one or more subscriber lines of a telephone network.

RELATED ART

A subscriber line of a telephone system typically has at least one wire pair that may simultaneously deliver both phone service and broadband service from a first location, such as a central office (CO), to a second location, such as a customer premises. The subscriber line communicates a variety of signals and voltages that include a ring signal, an off-hook signal, an audio signal and other signals that are well known to those skilled in the art. In order to better utilize the frequency bandwidth available on a wire pair, many service providers simultaneously transmit phone service signals and broadband service signals over the same wire pair. In some instances, multiple wire pairs may provide such services to the customer. The phone service signal voltages may have time varying swings of around 100 volts and generally have frequencies from approximately zero to 4 Kilohertz (KHz). The broadband signals, having frequencies up to about 12 Megahertz (MHz), generally have voltages with swings of less than about 10 volts.

In order to reduce the chance of damage to equipment connected to the ends of a wire pair, overvoltage protection circuits are installed across the wires near or within the equipment. Conventional phone service protection circuits, that meet applicable telecommunications protection requirements, may be used to protect equipment that is providing delivery of phone service and/or broadband service. A variety of protection devices for such protection circuits are available and known to those working in the telecommunication industry.

Perhaps the most used, because of price, performance and other factors, protection devices are semiconductor devices. These semiconductor devices are often referred by trade names such as Teccor's SIDACtor® hereafter referred to as a sidactor. Gas tubes are often used as primary protectors. However, gas tubes generally pass too much destructive energy from lightning and/or power cross events, so secondary protectors are needed in addition to the primary protectors. The secondary protectors may be zener diodes, but are more often an integrated combination of a triac and a trigger device. One such commercial embodiment is the sidactor. It has been observed that protection circuits having sidactors interact with the voltages of the phone service signals causing an undesirable reduction in data rates for some broadband services, such as very high-speed digital subscriber loop (VDSL) service. Even without phone service signals, broadband service may suffer from an undesirable reduction in data rates from the usage of sidactors. The reduction in data rates is typically more pronounced with the delivery of both types of service. However, data rate reduction has been observed in connections where only broadband service, such as VDSL service, is delivered.

Hence, it appears that a new semiconductor device or some other protection device such as an improved gas tube protection device is needed as an element of the protection circuit. It is known that a protection circuit using gas tube protection devices eliminates or greatly reduces the data rate reduction problem caused by traditional protection circuits using solid state protectors, such as sidactors. However, a gas tube protection device has performance limitations that include a slow response time and a short lifetime when compared to a sidactor.

In general, service providers desire to use a single pair to provide both broadband service and plain old telephone service (POTS). Because connected equipment requires line protection according to applicable industry standards and there is an undesirable interaction between the two services when using conventional semiconductor protection devices and circuits, there is a need for a device to provide protection and at the same time reduce broadband service degradation. It would be desirable if such a device could provide good voltage protection and also allow VDSL service and POTS to operate on the same pair without significant reduction in performance of either service. In addition, it would be desirable if the voltage protection device could be used in broadband only service without significantly impacting the data rate of this service.

SUMMARY OF THE DISCLOSURE

The present disclosure generally pertains to systems and methods for protecting equipment used to implement broadband service, such as VDSL. In accordance with one exemplary embodiment, protected equipment shares a common wire pair while reducing undesirable interaction between broadband service, such as VDSL, and POTS. In accordance with another exemplary embodiment, protected communication equipment uses a wire pair providing only broadband service, such as VDSL, without significantly affecting the data rates of the broadband service.

An exemplary protection circuit in accordance with one embodiment of the present disclosure comprises an arrangement of solid state protectors connected between the tip and ring of a wire pair. A bias voltage source is coupled to at least one of the nodes formed by the solid state protectors and the center node of the arrangement of solid state protectors is coupled to ground.

BRIEF DESCRIPTION OF THE DRAWING

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the figures.

DETAILED DESCRIPTION

In general, the present disclosure provides systems and methods for protecting data communication equipment from overvoltages when the equipment is connected to a wire pair of a telephone system. Protection circuits in accordance with the present disclosure can be particularly useful when a wire pair is simultaneously delivering plain old telephone service (POTS) and a broadband service. The disclosed protection circuits can also be beneficial in when a wire pair delivers only a broadband service. A protection circuit in accordance with an exemplary embodiment of the present disclosure when compared to conventional protection circuits, reduces the interaction between the two services that often result in a reduction in data rates of the broadband service. When only broadband service is delivered, a protection circuit in accordance with one exemplary embodiment of the present disclosure essentially eliminates the reduction of data rates that typically occur when a conventional solid state protection circuit is used.

Figure 1:
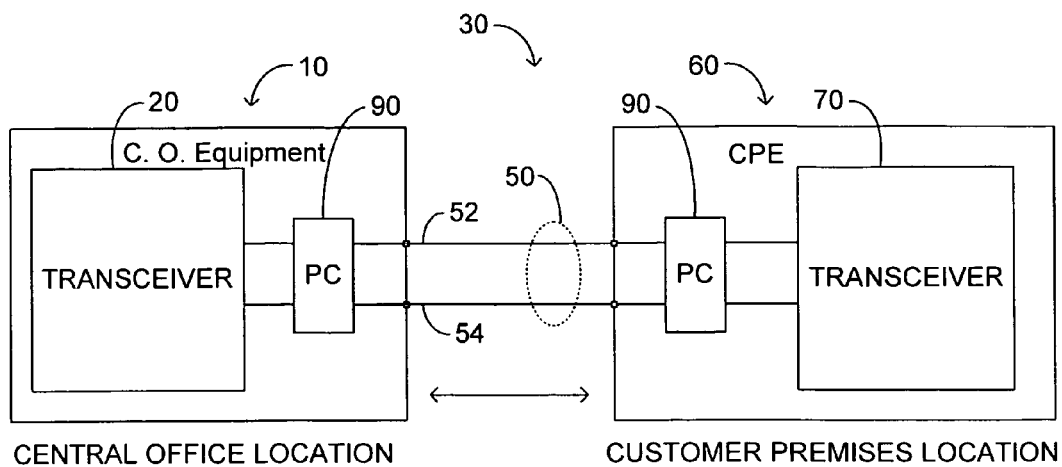
FIG. 1 illustrates an exemplary telecommunication system providing broadband service and/or POTS over a wire pair.

FIG. 1 illustrates a communication system 30 where telecommunication equipment 10 at a first location, such as a central office (CO), is connected via a twisted pair 50 to communication equipment 60 at a second location, such as a customer premises. The wire pair 50 has a first wire 52 and a second wire 54 that are generally referred to as the tip and the ring. The equipment 60 at the second location is often referred to as customer premises equipment (CPE). For some telecommunication systems 30, a broadband data signal is combined with a plain old telephone service signal and transmitted over the single twisted pair 50. Data flowing from the CO equipment 10 to the CPE 60 is referred to as downstream data and data flowing in the other direction is referred to as upstream data. The equipment 10 at the central office is comprised of a CO transceiver 20 and a protection circuit 90. At the customer premises, the equipment is comprised of a CP transceiver 70 and a protection circuit 90.

In order to protect the transceivers 20, 70 of the communication system 30, a protection circuit 90 across the tip 52 and ring 54 at both the central office and the customer premises. The protection circuit 90 may be located in the equipment 10, 60 or placed between the wire pair and the equipment. Each protection circuit 90 serves to keep the voltage sensitive electronic circuits and other components of a respective one of the transceivers 20, 70 and/or other components from being damaged by undesirable and unwanted voltages that may be coupled to the tip 52 or ring 54 from lightning or other sources. The telecommunication industry has certain performance requirements or standards for the protection circuits, such as described in Bellcore Specification 1089. In general, protection circuits use a variety of protection devices such as, for example, solid state protectors, such as sidactors, or gas discharge tubes. In general, the present disclosure is related to protection circuits using one or more solid state protectors, such as a Teccor part P6106A25C or P6135J024. Teccor solid state protection devices are available from the Littlefuse Corporation and, as already stated, are referred to as sidactors. Devices having characteristics similar to the sidactors are available from other manufacturers and generally have similar characteristics.

Figure 2:
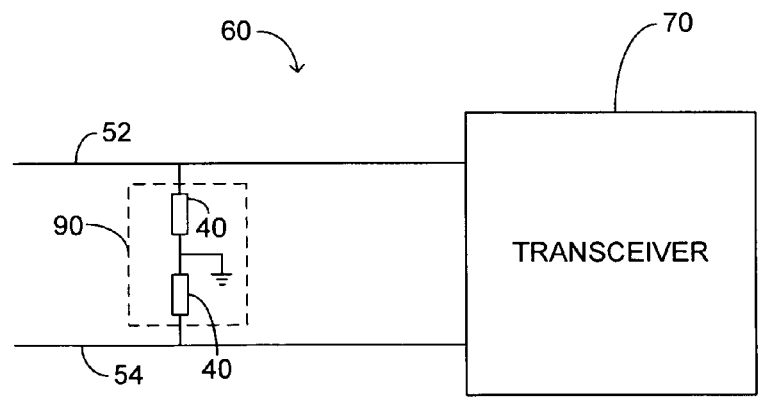
FIG. 2 illustrates a transceiver protected from overvoltages by a conventional protection circuit for the system of FIG. 1.

Referring now to FIG. 2, there is illustrated a conventional protection circuit 90 that has been placed across tip 52 and ring 54. One end of a first protection device 40 is connected to tip 52 and one end of a second protection device 40 is connected to ring 54. The other ends of the protection devices 40 are connected together forming a central node that is connected to ground. When a voltage on the tip 52 or ring 54 reaches a voltage turn-on value (a threshold value), one of the protection devices 40 provides a current path to ground. Generally, each protection device 40 has similar characteristics and same part number thereby forming a symmetrical arrangement about the central node. When only POTS (no broadband service) is provided on the twisted pair 50, conventional, protection circuit 90 satisfies protection requirements and essentially induces no impairments to POTS. However, in the case when broadband service is simultaneously delivered with POTS over the twisted pair 50 or when broadband alone is deployed over the twisted pair 50, resulting impairments from the protection circuit 90 may cause data errors or a reduction in the broadband service data rate. When data errors occur, the service provider normally reduces the data rate so as to provide error free transmission. In general, data errors increase as the frequencies in the broadband signal increase.

It has been determined that data errors in the broadband data service that may share a wire pair with POTS can be caused by the nonlinear impedance of the PDs 40. The nonlinear impedance of each PD 40 is caused by the fact that its capacitance varies with the applied voltage. The nonlinear impedance causes both harmonic and intermodulation distortion (IMD) of the broadband signal. The IMD then appears as noise to the broadband signal. Since an increase in noise results in a reduction of the signal-to-noise ratio of the broadband signal, there is a resulting degradation in performance.

Measurements show that PDs 40 located at the customer premise result in a reduced downstream data rate and that PDs 40 located at the CO result in a reduced upstream data rate. A conventional method for mitigating the drawbacks of the protection circuit 90 is to replace the PDs (sidactors) with gas tube protection devices. However, gas tubes are somewhat larger than sidactors, have a slower response time, let through more destructive energy, and have higher failure rates. Hence, it would be desirable to provide a protection circuit that utilizes solid state protection devices and does not have the nonlinear impedance deficiencies of conventional solid state protection circuits.

Figure 3:
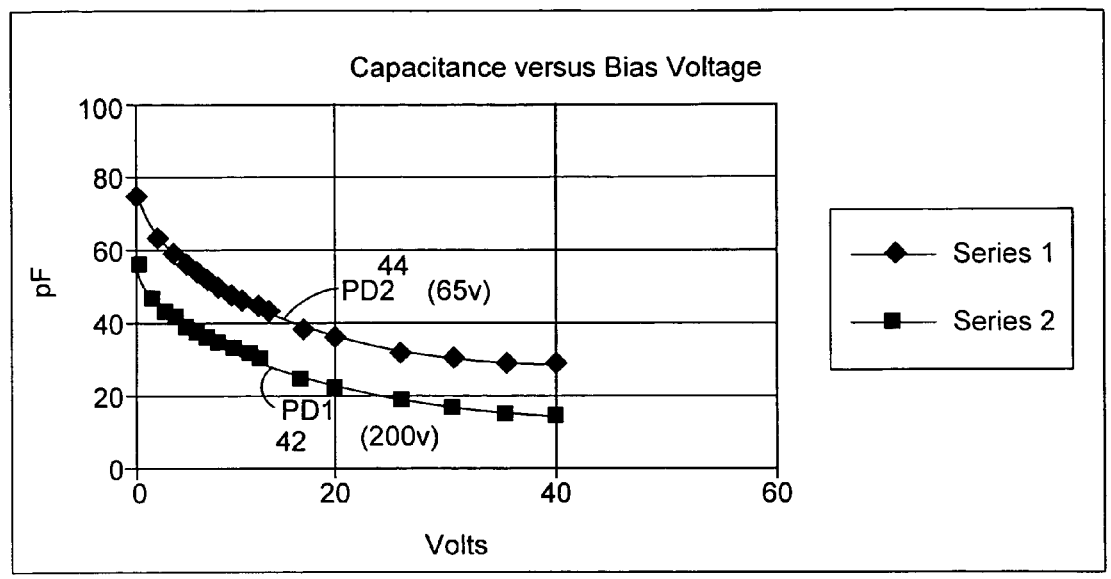
FIG. 3 illustrates exemplary variations of capacitance with bias voltages for semiconductor protection devices.

Some manufacturers, such as Teccor, indicate that the capacitance of their sidactor varies with voltage. Therefore, in order to understand the cause of the distortion and embodiments of a disclosed solution, measurements of capacitance variations for two of Teccor's device were taken and are shown in FIG. 3. Such measurements are examples of the capacitance with zero bias voltage and the variation of capacitance with changes in bias voltage. Consider the characteristics of a typical protection device, referred to hereafter as "PD1" 42, having a breakdown voltage of 200 volts, as shown in FIG. 3. The capacitance varies from around 56 picofarads (pF) at a zero volt bias to around 15 pF when a 40 volt bias is applied. If two such devices, PD1s, are placed in the conventional protective circuit 90 of FIG. 2, the capacitance of the series arrangement of two PD with a zero bias voltage is 28 pF. With a bias of 20 volts across each of the devices, the series arrangement of the PD1s, the capacitance is around 15 pF. A voltage swing of greater than 100 volts sometimes occurs across the tip 52 and ring 54 due to communication signals, i.e., POTS signals and/or broadband signals. If capacitance remained constant, and therefore the impedance, the impairments to the broadband signal would generally cause few, if any, data errors. Performance degradation of a broadband service, that may be sharing a wire pair delivering POTS, can be caused by the IMD brought about by the nonlinear capacitance of PDs. Variations in the capacitance of PDs can generally be caused by the large voltage variations of signals used for POTS. Even when the POTS caused voltage variations are absent, the VDSL signal can harm itself by modulating the PD's capacitance. The impedance variation across the tip 52 and ring 54 can particularly problematic when the broadband data signal has frequencies in the 10 MHz range. Note also in FIG. 3 that another typical protection device, hereafter referred to as "PD2 44', having a breakdown voltage of 65 volts, has capacitance that varies between around 80 pF and around 27 pF.

Figure 4:
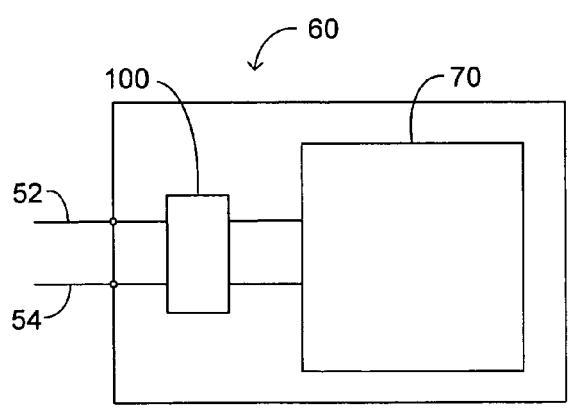
FIG. 4 illustrates a transceiver protected from overvoltages by an embodiment of a protection circuit in accordance with the present disclosure.

Referring now to FIG. 4, there is illustrated a protection circuit 100 in accordance with the present disclosure that has been placed across tip 52 and ring 54 near customer premises equipment 70. The protection circuit 100 can also be placed across tip 52 and ring 54 at the central office location for protecting central office equipment 20.

Figure 5:
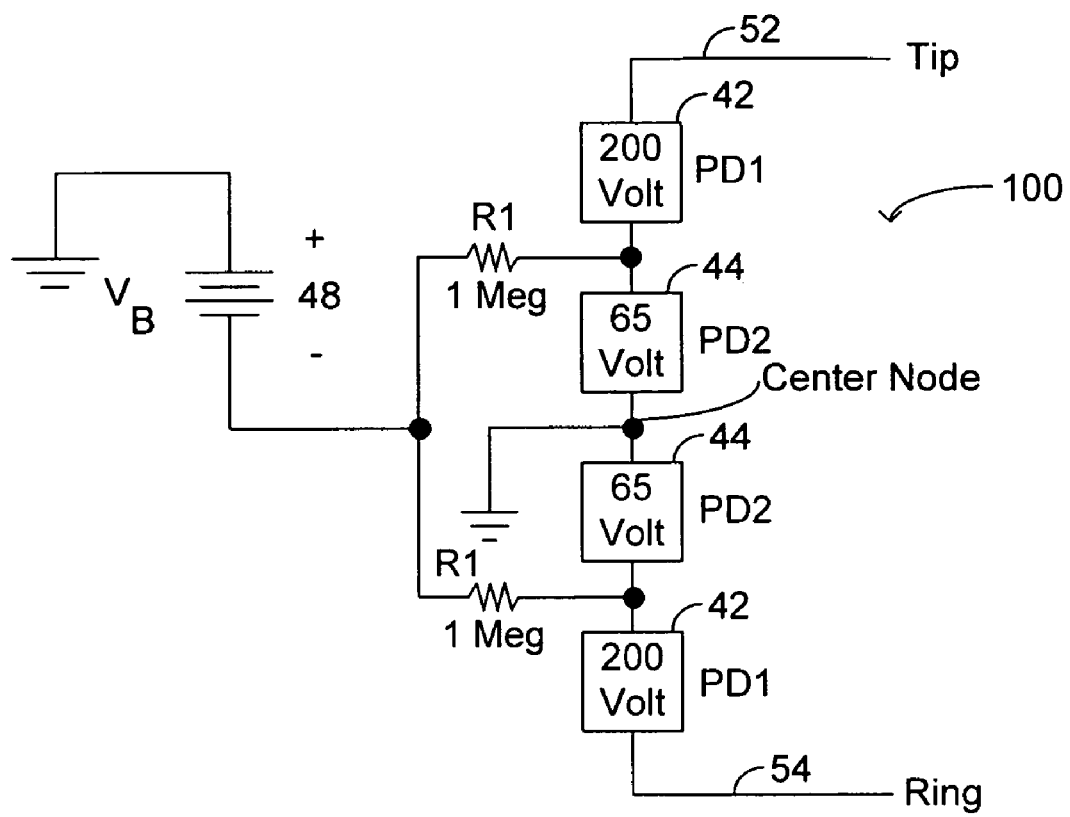
FIG. 5 illustrates a protection circuit for the system of FIG. 1 in accordance with an exemplary embodiment of the present disclosure.

An embodiment of a protection circuit 100 that has reduced capacitance variations, as compared to conventional protection circuits, in accordance with the present disclosure is shown in FIG. 5. Performance measurements have demonstrated protection circuit 100 reduces the IMD caused by the nonlinear capacitance solid state protectors. Protection circuit 100 is comprised of four PDs placed in a series arrangement as shown. A PD1 42 is connected to tip 52 and another PD1 42 is connected to ring 54. Between the PD1s 42 are two PD2s 44. The node formed where the two ends of the PD2s are coupled, the center node, together is connected to ground. A voltage source with a voltage, VB, is impedance coupled to the nodes formed by the PD1s and PD2s. The exemplary impedances, R1s, coupling the voltage source to the nodes are each a 1 Mega-ohm resistors, but other values are possible in other embodiments. VB has a value of 48 volts for the embodiment of FIG. 5. Because the voltage protection rating for the embodiment from tip 52 or ring 54 to ground is 265 volts, the equipment is protected according to the appropriate standard. Because the bias voltage across each of the PD2s is constant, the capacitance of these solid state protectors is fixed at around 27 pF. The capacitance of the PD1s may vary from a maximum of 56 pF to a minimum of 15 pF. The maximum and minimum values of capacitance from tip 52 to ring 54 can be determined using basic circuit theory.

Although the protection circuit 100 uses PD 42 and PD2s 44, having characteristics as shown in FIG. 3, other solid state devices with other characteristics can be used as elements for embodiments of protection circuit 100. In general, a protection circuit 100 of the present disclosure, as seen from the central node, has a symmetrical structure in order for wire pair 50 to furnish a balanced load to transceivers 20, 70. Variations from the symmetrical structure can also form additional embodiments of protection circuit 100.

Figure 6:
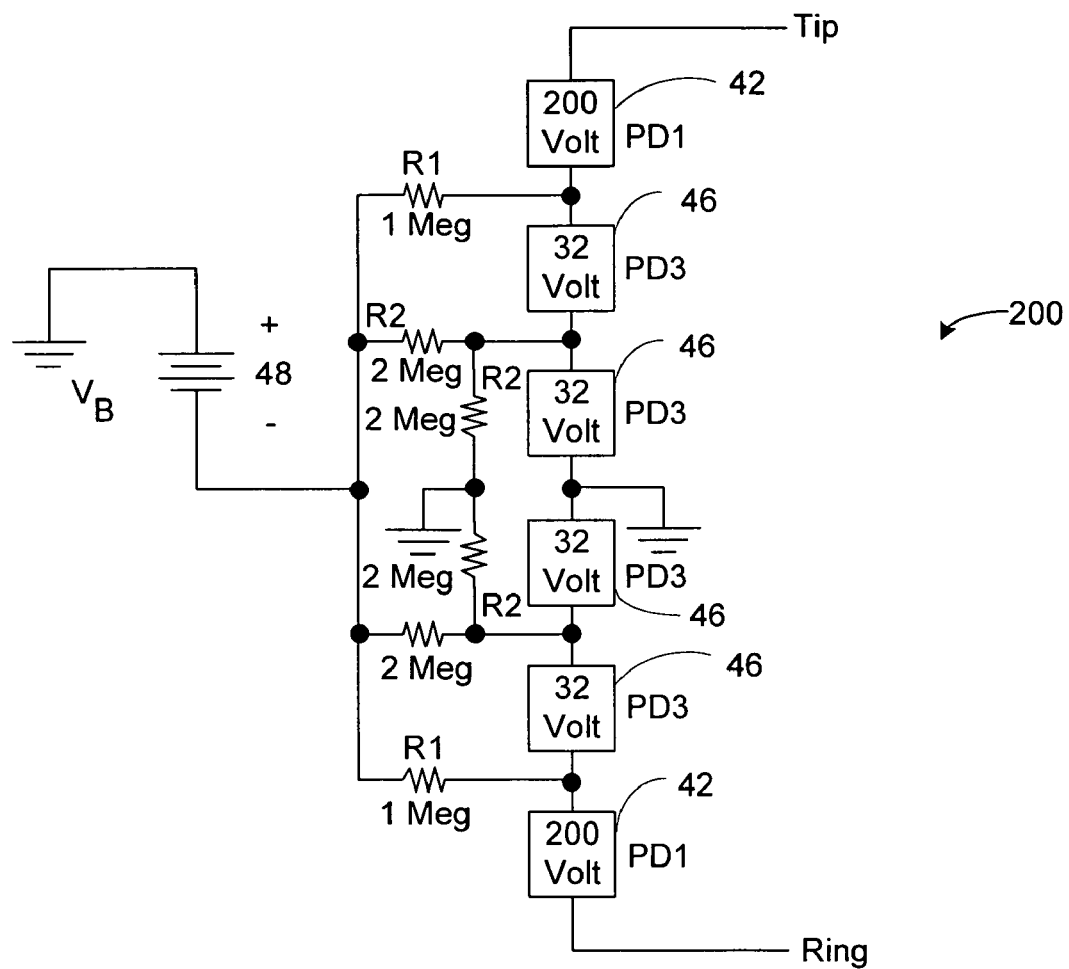
FIG. 6 illustrates a protection circuit for the system of FIG. 1 in accordance with another exemplary embodiment of the present disclosure.

Another embodiment of a protection circuit 200 that has the capacitance variations, as compared to conventional protection devices, in accordance with the present disclosure is shown in FIG. 6. Performance measurements have demonstrated protection circuit 200 reduces the IMD caused by the nonlinear capacitance of solid state protectors. Protection circuit 100 is comprised of six PDs placed in a series arrangement as shown. A PD1 42 is connected to tip 52 and another PD1 42 is connected to ring 54. Connected between the PD1s are four PD3s 46 in series. The node formed at the middle of the series arrangement is referred to as the center node. The center node is coupled to ground. A voltage divider is comprised of six resistors (R1s and R2s) that provide a bias of 24 volts, when VB is 48 volts, across each of the PD3s 46. Although the voltage source, VB, has a value of 48 volts other voltage values may be used in other embodiments having other voltage divider circuits. The minimum and maximum values of capacitance from tip 52 to ring 54 may be calculated using basic circuit theory.

Although the protection circuit 200 of FIG. 6 and the protection circuit 100 of FIG. 5 still have nonlinear capacitance, the minimum value of the capacitance and the variations in capacitance have eliminated or reduced the IMD caused by the conventional protection circuit 90 of FIG. 2. Although the protection circuits 100, 200 are designed to provide protection to telecommunication equipment, the protection circuits 100, 200 may be used to protect other electronic devices and/or equipment.

Figure 7:
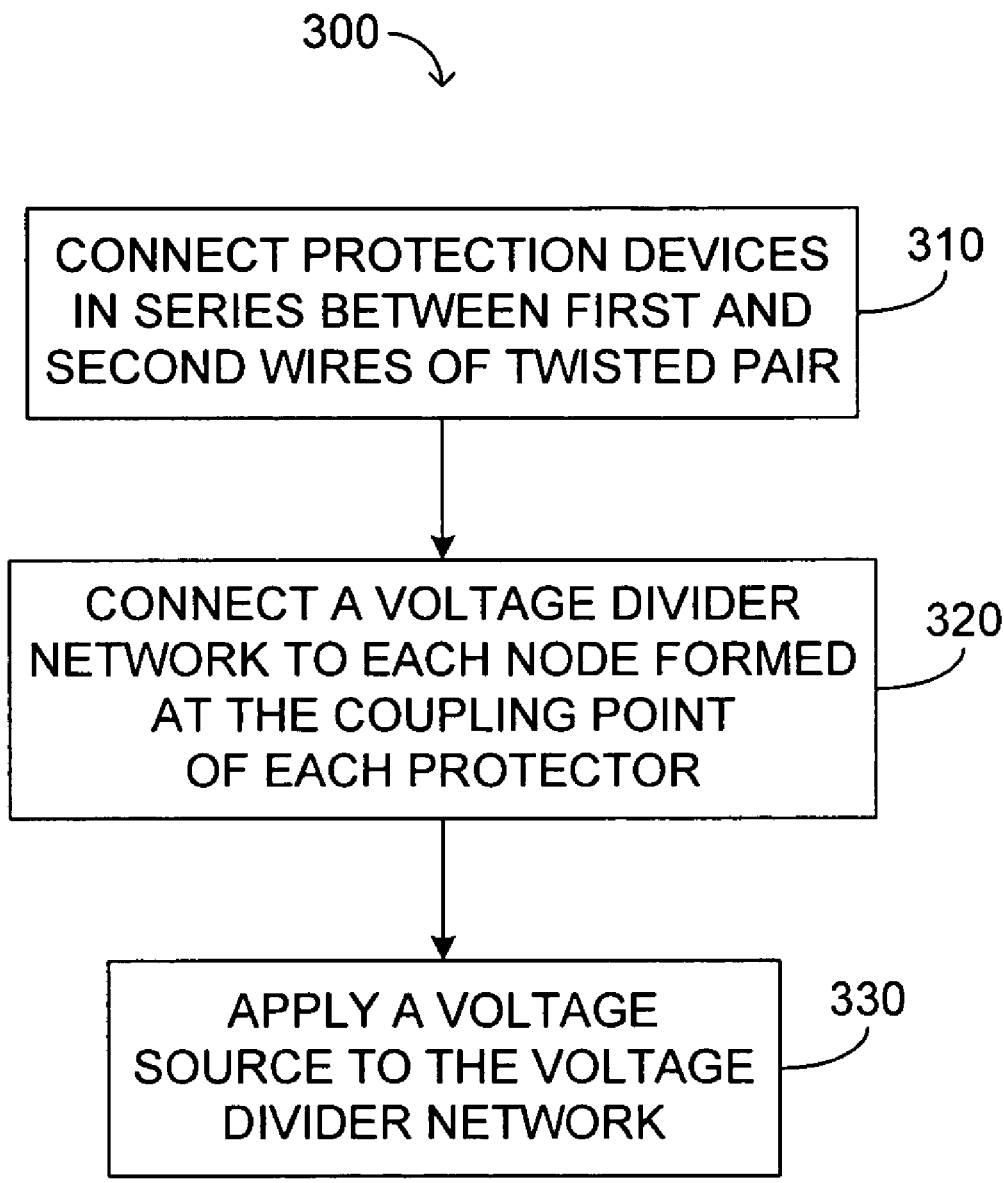
FIG. 7 illustrates a method for protecting communication equipment in accordance with an exemplary embodiment of the present disclosure.

An exemplary method embodiment 300 for protecting telecommunication using protection circuits in accordance with the present disclosure equipment is shown in FIG. 7. A series arrangement of protection devices is selected to meet the overvoltage protection requirements for the wire pair 50 of a telecommunication circuit. As shown by block 310 of FIG. 7 the series arrangement is connected between tip 52 and ring 54. In general, an even number of protection devices are used to form the series arrangement. A voltage divider is connected to the nodes formed by the series arrangement as shown by block 320. The center node of the series arrangement is coupled to ground. A voltage source is connected to a voltage divider so that a bias voltage is placed across selected protection devices as shown by block 330.

While the disclosure has been described in detail, it is to be expressly understood that it will be apparent to persons skilled in the relevant art that the protection circuits described above may be modified without departing from the spirit of the disclosure. Various changes of form, design or arrangement may be made to the protection circuits without departing from the spirit and scope of the disclosure. Therefore, the above mentioned description is to be considered exemplary, rather than limiting, and the true scope of the disclosure is that defined in the following claims.

What is claimed is:

1. A protection circuit for protecting equipment coupled to a wire pair from overvoltages, the protection circuit comprising:

a first protection device having a first terminal and a second terminal, wherein the first terminal is coupled to a tip of the wire pair;

a second protection device in a series arrangement with the first protection device coupled between the second terminal of the first protection device and ground;

a third protection device, in a series arrangement with the first and second protection devices, having a third and fourth terminal wherein the third terminal is coupled to a ring of the wire pair;

a fourth protection device in a series arrangement with the first protection device, the second protection device, and the third protection device, the fourth protection device coupled between the fourth terminal and ground;

a voltage source coupled to nodes formed by the series arrangement of the protection devices, wherein at least one of the nodes to which the voltage source is coupled is between at least two of the protection devices; and an impedance device coupled between the voltage source and the nodes formed by the series arrangement of the protection devices.

2. The protection circuit of claim 1, wherein the first protection device has a first breakdown rating and the additional protection devices have additional breakdown ratings.

3. The protection circuit of claim 1, wherein the protection devices are sidactors.

4. The protection circuit of claim 1, wherein the voltage source is coupled to the nodes through an impedance network thereby providing a desired voltage at each node.

5. An equipment protection system for protecting equipment coupled to a tip and ring of a wire pair, the system comprising;
   a first series arrangement of protection devices coupled between the tip and ground;
   a second series arrangement of protection devices coupled between the ring and ground, the second series arrangement in series with the first series arrangement;
   a voltage source coupled to at least one node of the series arrangements to provide bias voltage to a least one protection device, wherein the node to which the voltage source is coupled is between at least two of the protection devices; and
   an impedance device coupled between the voltage source and the at least one node of the series arrangement.

6. The equipment protection system of claim 5, wherein the first series arrangement and second series arrangement have protection devices of the same rating and are symmetrically arrange with respect to ground.

7. The protection system of claim 6, wherein there are two protection devices in each series arrangement.

8. The protection system of claim 5, wherein the voltage source is coupled to the nodes of the series arrangements through a voltage divider circuit.

9. An apparatus coupled between a tip and a ring of a wire pair, the apparatus comprising:
   a first series arrangement of protection devices coupled between the tip and ground wherein at least one of the protection devices is biased by a voltage source applied between at least two of the protection devices;
   an impedance device coupled between the voltage source and the at least two of the protection devices; and
   a second series arrangement of protection devices coupled between the ring and ground, wherein the second series arrangement is in series with the first series arrangement.

10. The apparatus of claim 9, wherein at least one of the protection devices of the second series arrangement is biased.

11. A protection circuit coupled to a tip and ring of a wire pair, the protection circuit comprising:
   a series arrangement of protection devices coupled between the tip and ring wherein a center node of the series arrangement is coupled to ground; and
   a bias voltage source coupled to at least one other node of the series arrangement, wherein the at least one other node to which the bias voltage source is coupled is between at least two of the protection devices,
   wherein the series arrangement of protection devices comprises at least a first protection device, a second protection device, a third protection device, and a fourth protection device, wherein the center node is between the second and third protection devices, and wherein the bias voltage is applied between the first and second protection devices and between the third and fourth protection devices.

12. The protection circuit of claim 1, wherein the first, second, third, and fourth protection devices are configured to diminish nonlinearly in capacitance in response to increased applied voltages to the protection devices.

13. The protection circuit of claim 12, wherein the voltage source holds capacitance of the second and the third protection devices to a substantially constant value.

14. The protection circuit of claim 1, wherein current begins to flow through the first and the third protection devices in the series arrangement when a voltage on tip or ring, respectively, exceeds a threshold value.

15. The protection circuit of claim 14, wherein capacitance decreases in the first and the fourth protection devices as the voltage on tip or ring, respectively, increases above the threshold value.

16. The protection circuit of claim 15, wherein the voltage source is applied such that capacitances of the second and fourth protection devices decrease.

* * * * *